Nov. 21, 1961 R. A. NEWTON ET AL 3,009,398
MACHINE TOOL
Filed April 15, 1959 3 Sheets-Sheet 1
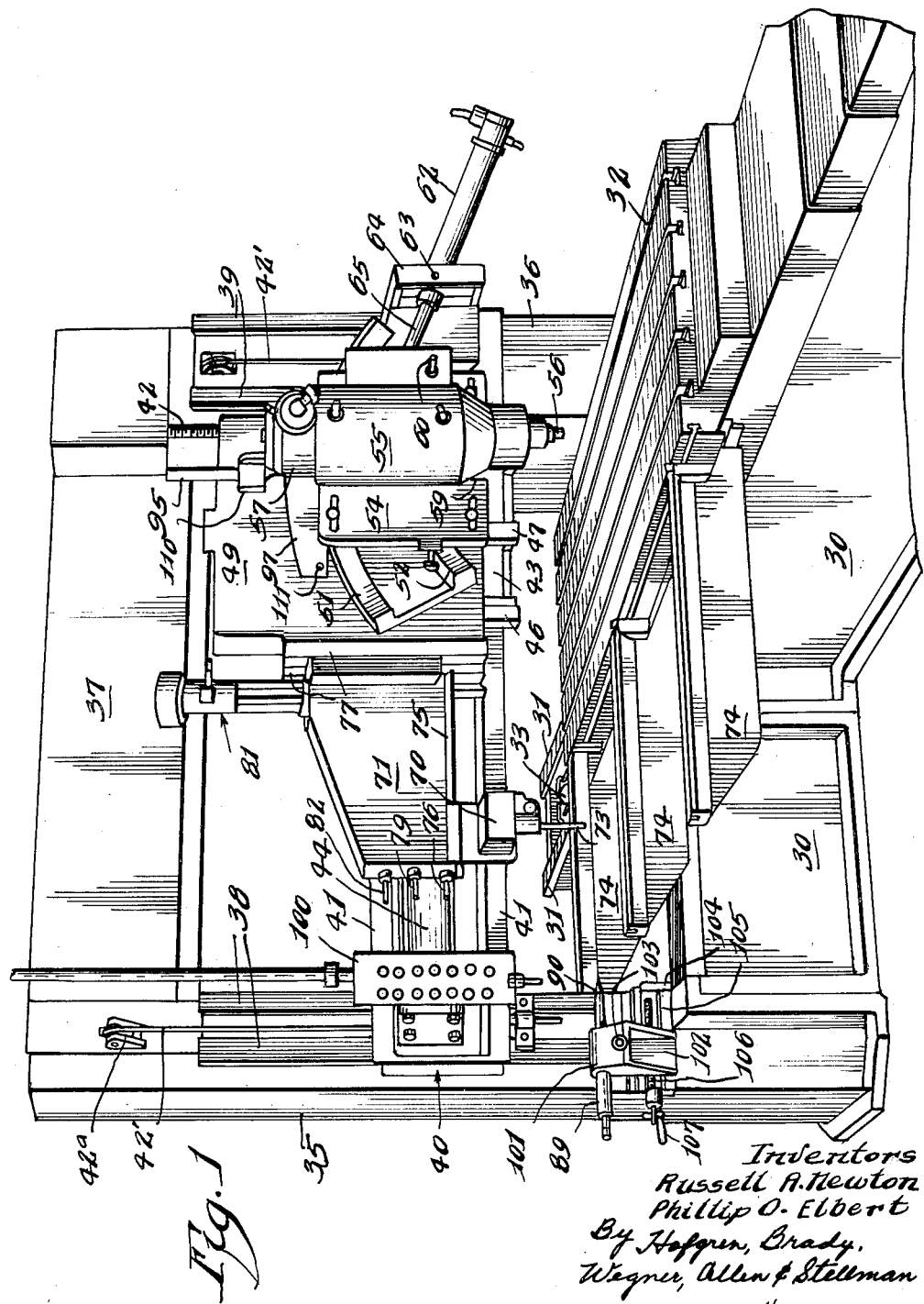

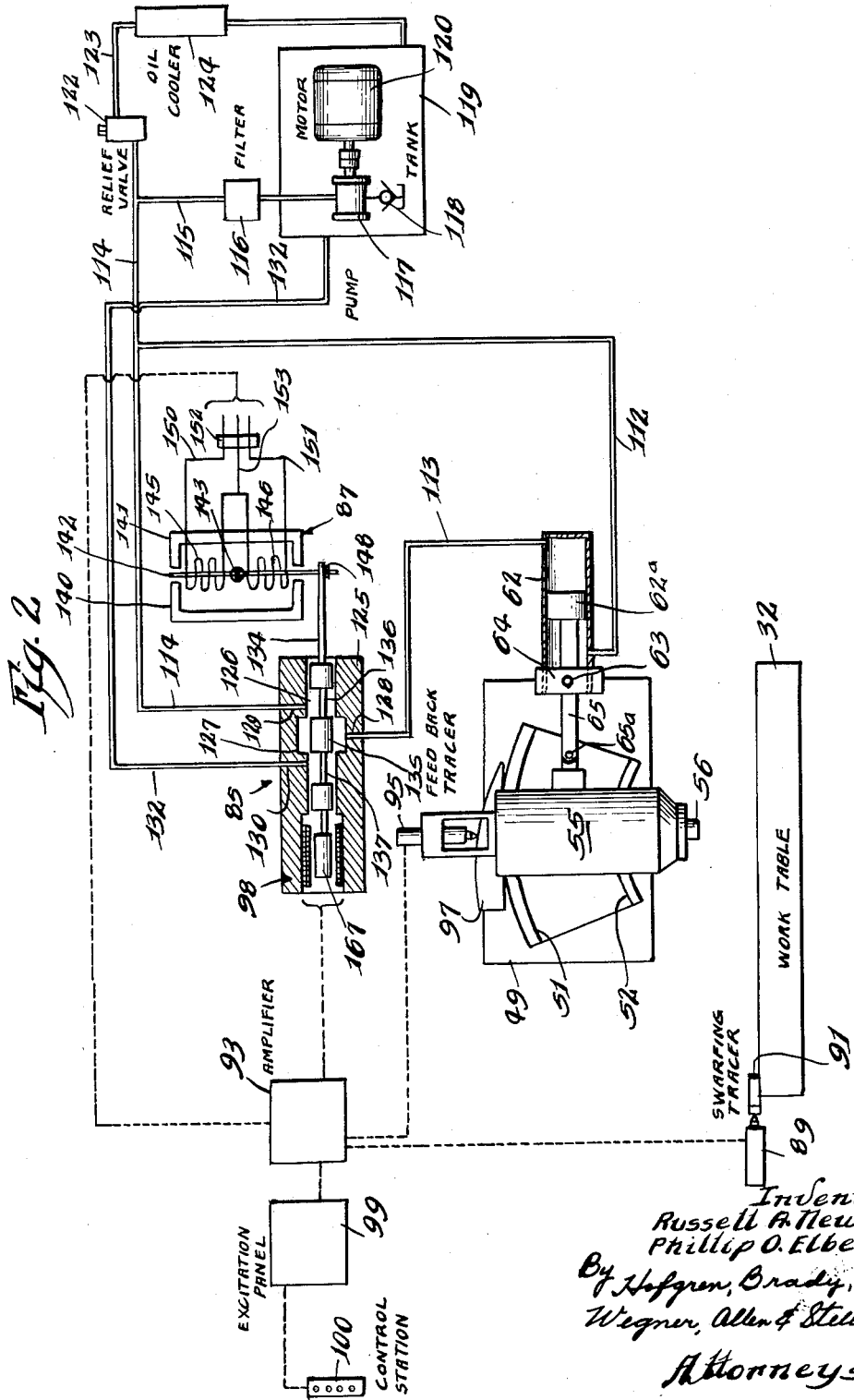

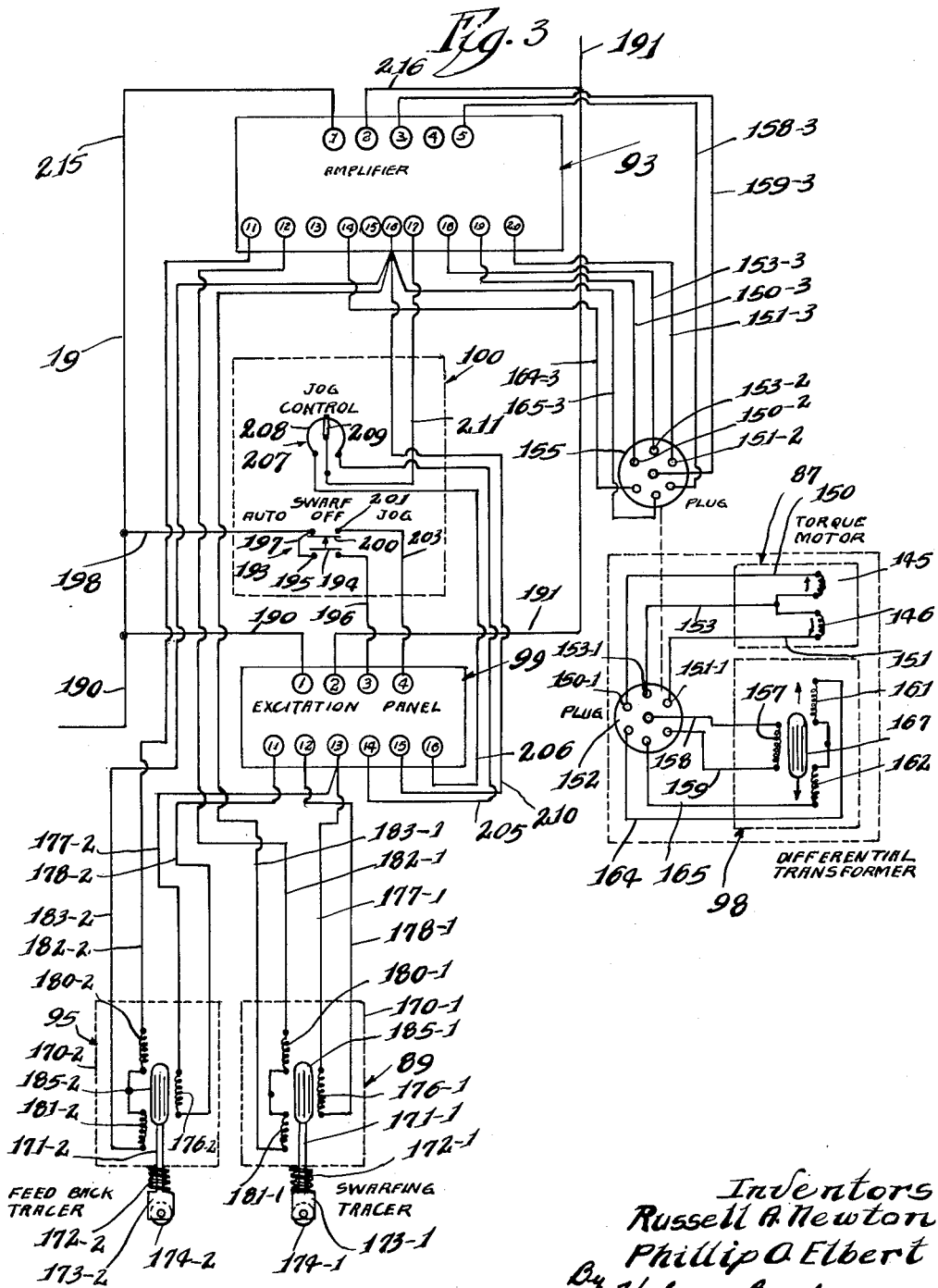

United States Patent Office 3,009,398
Patented Nov. 21, 1961

3,009,398
MACHINE TOOL
Russell A. Newton and Phillip O. Elbert, Rockford, Ill., assignors to Rockford Machine Tool Co., a corporation of Illinois
Filed Apr. 15, 1959, Ser. No. 806,706
13 Claims. (Cl. 90—13)

This invention relates to machine tools, more particularly to tracer controls for machine tools, and specifically to swarfing controls for a milling machine.

"Swarfing" is a term used in the aircraft industry to describe the formation of curved or warped (not flat, vertical or horizontal) outer surfaces on air frame parts such as aluminum wing or other air foil surfaces. Such surfaces may be formed by milling tools. Accordingly, "swarfing" may describe a milling operation.

At this date, swarfing is not novel per se, as several machines of varied construction have been designed for swarfing. These machines usually employ a tiltable milling head and preferably include tracer controls for designating the movement of the milling head. One of the principal problems in the design of such machines lies in the problem of applying a feedback or follow-up correction to the tracer proportional to the head movement to neutralize the tracer upon completion of the movement dictated by the tracer. These problems are intensified due to the arcuate movement of the milling head.

According to conventional practice in fields other than swarfing, the tracer is mounted on the milling head itself or on a support for the milling head so that the tracer moves with the head. In installations of this type, particularly one dimension tracer controls, feedback or follow-up corrective movement of the tracer device to neutralize or stabilize the tracer device is relatively simple as such corrective motion follows inherently due to the mounting of the tracer on the tracer controlled milling head. In swarfing machines where the tilting movement of the tool is tracer controlled, it is impractical to mount the tracer, or the template, on the milling head. To do so requires the use of a complex three-dimensional template which is complicated and time-consuming to compute and design and expensive to manufacture. In the past, some designs have provided for the mounting of the tracer on some part of the machine other than the tiltable milling head. But, this arrangement does not inherently provide for feedback or follow-up corrective motion of the tracer, and some additional provision must be made for this purpose. These provisions have usually taken the form of a direct or indirect mechanical connection from the tiltable head or its actuating means to physically adjust the position of some portion of the tracer mechanism such as a valve stem, a valve housing, or a tracer mounting. One disadvantage of such complex systems is the expense of manufacture and maintenance to provide sufficient accuracy.

It is a general object of this invention to provide a new and improved tracer control for a swarfing machine which obviates the disadvantages alluded to above.

Another object is to provide a new and improved swarfing control wherein the tracer is supported on the machine base rather than the milling head so that a planar template having a linear pattern edge may be employed.

A further object is to provide a new and improved swarfing control wherein the tracer is stationarily mounted on the machine frame so that no feedback or follow-up corrective movement need be imparted thereto by the milling head through the medium of complicated mechanical interconnections.

A more specific object is to provide a new and improved swarfing control of the type described including an electric tracer controlling movement of the tilting tool head, and an electric feedback tracer actuated by the tiltable head for canceling out the effects of the swarfing tracer. This is particularly important in machines utilizing in addition to the swarfing control a three-dimensional tracer controlling movement of the milling head in three straight-line directions normal to each other.

Another important object is to provide a new and improved swarfing control of the type described in the preceding paragraph wherein the ratio of electric tracer stylus deflection to angular movement of the swarfing head is constant so as to eliminate the involved mathematics necessary to produce a template.

A further object is to provide a new and improved swarfing control of the type described including a manual control for the electric system to enable positioning of the tiltable head at any given angle for machining without the use of the swarfing template.

It is also an object of the invention to provide a swarfing control of the type described wherein the tiltable head is automatically returned to the vertical position when the swarfing tracer is turned off.

Other objects and advantages will become readily apparent from the following detailed description taken in connection with the accompanying drawings, in which:

FIG. 1 is a fragmentary front perspective view of a machine having a swarfing control embodying the principles of the present invention, this view illustrating principally the physical arrangement of the structural parts of the machine and omitting most of the electric and hydraulic circuitry;

FIG. 2 is a schematic layout of the components of the machine illustrated in FIG. 1 which are important to the present invention, including a showing of the hydraulic circuitry; and FIG. 3 is a wiring diagram illustrating the electric circuits.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

*Machine in general*

Referring now to the drawings in more detail, and particularly FIG. 1, a typical machine embodying the swarfing control of this invention may include a base 30 having suitable horizontal ways as at 31 on which a work supporting table 32 is mounted for reciprocable sliding movement as by means of a piston and cylinder device including a cylinder 33 suitably secured to the base and having a piston rod (not visible) connected to the table for moving the same back and forth. At opposite sides of the base 30 and the table 32, two vertical columns 35 and 36 are provided, and at the upper ends the columns are suitably interconnected by a transverse frame structure generally designated 37. The column 35 is provided with vertically extending guide ways 38, and the column 36 includes vertical guide ways 39. On the guides 38 and 39, a cross rail structure 40 is supported for vertical adjustment as by means of an electric motor (not visible) operating an adjustment screw 42 having a suitable connection to the cross rail structure.

The cross rail 40 is provided with parallel horizontal ways 41 which slidably support a saddle structure 43 for horizontal reciprocable movement as by means of a piston and cylinder device including a cylinder 44 suitably mounted within the hollow cross rail and having a piston rod (not visible) connected to move the saddle.

The saddle 43 is formed with three vertical guides, two of which are visible at 46 and 47, for supporting a vertical slide 49 movable by a piston and cylinder device (not visible) connected between the saddle and the slide.

The vertical slide 49 has suitably formed thereon or secured thereto a pair of parallel, concentric arcuate guide ways 51 and 52, and these ways slidably support a plate 54 having a milling head 55 secured thereon. The milling head 55 is preferably a self-contained unit including a tool spindle as at 56 and an attached electric motor 57 for driving the spindle. The head 55 is preferably vertically adjustable on guides as at 59 on the plate 54. Adjustment of the head may be effected by means of a tool receiving spindle 60 for operating a screw mechanism (not visible).

Preferably, the center for the arcuate ways 51 and 52 is located such that the tool pivots about a center out in space, that is, disposed outside of the tool itself as pivotal movement about a center within a part of the tool would cause movement of a portion of the tool toward the work and movement of a portion of the tool away from the work.

The plate 54 supporting the milling head 55 may be moved on the arcuate ways 51 and 52 as by means of a piston and cylinder device including a cylinder 62 pivotally mounted as at 63 on a frame 64 supported on the vertical slide 49. A piston rod 65 has a suitable pivotal connection 65a (FIG. 2) with the plate 54 so that reciprocable movement of the piston rod in the cylinder 62 effects movement of the plate 54 and the head 55 back and forth on the arcuate ways 51 and 52.

Summarizing briefly, movement of the cross rail 41 on the vertical columns 35 and 36, and vertical movement of the head 55 on the plate 54 are both adjusting movements as compared to feed movements or milling movements of the head. On the other hand, horizontal movement of the table 32, transverse movement of the saddle 43, and vertical movement of the slide 49, all hydraulically effected, may be utilized as feed movements during operation of the machine.

The three-dimensional feed movements referred to above may be controlled, if desired, by a conventional three-dimensional hydraulic tracer mechanism 70 mounted on a support 71 in turn mounted on the vertical slide 49, so that the tracer 70 moves with the head 55 during operation. The tracer 70 includes a stylus as at 73 adapted for engagement with a suitable one-, two-, or three-dimensional template which may be attached to suitable laterally extending arm supports as at 74 carried by the reciprocating table 32. The tracer 70 is horizontally adjustable on a dovetail guide 75 on the bottom of the tracer support 71, and this adjustment may be effected by means of a tool receiving shaft end 76 and an intervening screw mechanism (not visible). The tracer support 71 is vertically adjustable on guides 77 on the vertical slide 49. This adjustment may be effected by means of a tool receiving shaft end 79 and suitable intervening screw mechanism (not visible).

The tracer 70 may be utilized to control the three-dimensional movements of the table 32, the saddle 43, and the vertical slide 49 in a manner now well-known. Alternatively, the tracer may be selectively adjusted for providing only control in one or two dimensions. When vertical movement of the slide 49 is not controlled by the tracer mechanism 70, the vertical positioning of the slide may be under control of an indexing mechanism generally designated 81 which in turn may be operated by a tool receiving shaft end 82 and an interviewing screw mechanism (not visible).

The cross rail 40 and the structure carried by the cross rail are counterbalanced by means including cables as at 42′, one at each of the columns 35 and 36, passing over pulleys as at 42a and suitably connected to a counterbalance means.

The machine as described thus far is largely conventional and has been described to indicate the environment in which the invention is utilized, but will not be described further or in complete detail as such a description is not necessary to an understanding of the invention.

Swarfing control in general

Referring now to FIG. 2 of the drawings, movement of the milling head 55 on the arcuate ways 51 and 52 is controlled by the piston and cylinder device including the cylinder 62 having a piston 62a slidable therein and a rod 65 having a pivotal connection as at 65a to the plate 54 which supports the head. Actuation of the piston and cylinder device is controlled by a servo valve 85. The valve 85 is controlled by a torque motor 87 which is reversible to effect movement of the valve stem in opposite directions to thereby obtain movement of the piston 62a in opposite directions. Operation of the torque motor 87 is controlled by an electric swarfing tracer 89 which is mounted on the column 35 (FIG. 1) and has a stylus engageable with a template as at 91 suitably mounted on the arms 74 (FIG. 1) movable with the worktable 32. Movement of the swarfing stylus in response to variations in the pattern edge of the template 91 produces a voltage signal which is delivered to an amplifier 93 which transmits a proportional signal for operating the torque motor 87. Operation of the motor 87 ultimately effects movement of the head 55, and the plate 54 (FIG. 1) on which the head is mounted carries a feedback tracer 95 having a stylus engageable with a template 97 attached to the vertical slide 49. The feedback tracer 95 produces a voltage signal equal and opposite that produced by the swarfing tracer 89, but lagging the signal of the swarfing tracer. The feedback signal is delivered to the amplifier 93 which produces a proportional signal which is delivered to the torque motor 87 to close the valve 85 when the movement dictated by the template 91 has been effected.

Preferably, a differential transformer 98 is utilized to provide an anticipating signal to enable accurate positioning of the servo valve. The amplifier is partly energized through an excitation panel 99 under control of a control station 100.

Referring briefly to FIG. 1, the electric swarfing tracer 89 is carried by a holder 101 which may be adjusted horizontally on a support 102 as by means of a screw shaft 103. The support 102 is slidably mounted for transverse adjustment on guides 104 of a base 105 secured to the column 35. Adjustment of the support 102 may be effected by a screw shaft 106 having a manually accessible handle 107.

The electric feedback tracer 95 is held in a bracket 110 suitably secured to the plate 54. The feedback template 97 is secured to the vertical slide 49 as by bolts or screws such as that at 111.

Hydraulic circuit

Referring again to FIG. 2, fluid is supplied to the left end of the cylinder 62 through a conduit 112, and fluid is supplied to the right end of the cylinder through a conduit 113. The conduit 112 branches off from a main supply conduit 114 in turn connected by a conduit 115 and a filter 116 to a pump 117. The pump 117 is supplied through an intake check valve 118 from a tank or reservoir 119, and may be driven by an electric motor 120. A suitable relief valve 122 controls the pressure of fluid in the delivery conduits 115, 114 and returns excess fluid through a conduit 123 and a cooler 124 to the tank 119.

It will be understood that so long as the pump 117 is operating, fluid under pressure will be delivered to the left end of the cylinder 62. On the other hand, fluid under pressure is delivered to the right end of the cylinder through conduit 113 under control of the servo valve 85. The valve 85 comprises a valve body 125 having a bore 126, an inner annular groove 127, a cylinder port 128 connecting the groove 127 and the conduit 113, a pressure port 129 connecting the bore 126 to the delivery conduit 114, and a drain port 130 connecting the bore 126 to a return conduit 132 leading to the tank 119.

A valve stem 134 in the bore 126 includes a central land 135 and grooves 136 and 137 on opposite sides of the land 135.

In operation, when the valve stem 134 is positioned in a neutral center position, with the central land 135 centered in the bore groove 127, fluid pressure delivered through the conduit 114 leaks past the central land 135 at both ends thereof in two equal pressure drops, the first leakage and pressure drop at the right end of the land and the second at the left end of the land. These pressure drops are substantially equal, and the pressure in the bore groove 127 is thus one-half the pressure in the conduit 112 and in the left end of the cylinder 62. As the left end of the piston 62a has a surface area equal to one-half the surface area at the right end of the piston, the full pressure acting against the left end of the piston and the half pressure acting against the right end of the piston will maintain the same motionless in the cylinder 62.

If the valve stem 134 is moved toward the left as viewed in FIG. 2, communication between the drain port 130 and the cylinder port 128 is interrupted, and the pressure port 129 is connected directly to the cylinder port 128 to apply the full pressure of the pump delivery conduit against the right end of the piston 62a and thereby effect movement of the milling head toward the left. When the valve stem 134 is moved toward the right as viewed in FIG. 2, communication between the cylinder port 128 and the pressure port 129 is interrupted, and the cylinder port 128 is connected to the drain port 130, so that the pressure acting against the left end of the piston 62a effects movement of the milling head 55 toward the right. The velocity of the piston 62a is a function of the flow of oil through the valve 85 which in turn is proportional to the valve displacement under control of the torque motor 87.

*Electric circuit*

The servo valve 85, the torque motor 87, and the differential transformer 98 are preferably a commercially available package unit such as a Minneapolis-Honeywell electro-hydraulic servo valve unit model No. XVJ302B8. As seen in FIG. 2, the torque motor comprises a pair of permanent magnet pole pieces 140 and 141, an armature 142 having its mid portion pivoted as at 143, and a pair of windings 145 and 146 on opposite ends of the pivoted armature. The pivoted armature 142 is connected to the valve stem 134 as at 148 to produce movement of the valve stem in response to movement of the armature. In a typical installation, the armature end, and therefore the valve stem, has a .030″ range of travel. Opposite ends of the coils 145 and 146 are connected respectively to wires 150 and 151 which lead to a male plug 152. Adjacent ends of the coils 145 and 146 are connected to a wire 153 leading to the plug 152.

Referring now to FIG. 3, the male plug 152 has a plurality of terminals corresponding to the wires 150, 151, and 153, these terminals being designated by similar reference numbers followed by the suffix –1. The terminals of the male plug 152 are adapted to mate with corresponding terminals of a female plug 155 having terminals bearing similar reference numbers followed by the suffix –2. The terminals of the female plug 155 connect with wires given similar reference numbers and bearing the suffix –3. Thus, it will be understood that the wires 150, 151 and 153 are connected by means of the plugs to the terminals 18, 20 and 19 respectively of the amplifier 93.

In operation, the coils 145 and 146 of the torque motor receive signals respectively from the swarfing tracer 89 and the feedback tracer 95 through the amplifier 93, and so long as the two signals are equal, the armature 142 remains centered between the pole pieces 140 and 141, maintaining the valve stem 134 in the central closed position. The permanent magnet torque motor produces armature movement proportional to the difference between the currents flowing through the coils 145 and 146. The direction of motion of the armature from its neutral central position is determined by the coil in which the greater current is flowing. For example, with 60 milliamp. flowing through both coils the differential current is 0 milliamp. and the armature is in the neutral position. Any other differential current will result in a displacement proportional to that current, with the direction of motion determined by the coil in which the greater current is flowing. Thus, the armature and the valve stem may be positioned to any point within the range of travel. As will appear presently, the coils 145 and 146 are controlled by the tracers 89 and 95.

As seen in FIG. 3, the differential transformer 98 includes a primary winding 157 connected for excitation by means of wires 158 and 159 leading from opposite ends of the coil to terminals on the male plug 152 adapted to mate with corresponding terminals on the female plug 155, and the latter are in turn connected respectively to wires 158–3 and 159–3 leading to the terminals 3 and 5 of the amplifier 93. The transformer includes secondary windings 161 and 162 having adjacent ends connected together and opposite ends connected respectively to wires 164 and 165. The wires 164 and 165 lead to terminals on the male plug 152 adapted to mate with corresponding terminals on the female plug 155, the latter being in turn connected to wires 164–3 and 165–3 leading respectively to the terminals 14 and 16 of the amplifier 93.

The transformer includes a core 167 which, as seen in FIG. 2, is secured to the valve stem 134 for movement therewith in opposite directions from the neutral center position illustrated in FIGS. 2 and 3. The construction described provides a feedback transducer which produces an output voltage proportional to valve displacement and supplied to the amplifier 93. This voltage, used as a feedback, improves the frequency response of the amplifier-valve loop, permits a higher static gain adjustment, and substantially reduces the effects of any static friction or hysteresis that may be present. This results in a greater accuracy in positioning the valve stem 134 and minimizes the tendency toward hunting.

The swarfing tracer 89 and the feedback tracer 95 are identical in construction, and each may comprise a commercially available item such as the Minneapolis-Honeywell linear position transducer model No. XTJ306A6. As these tracers are comprised of similar parts, the parts are given similar reference numbers followed by the suffix –1 for the parts of the swarfing tracer 89 and the suffix –2 for the parts of the feedback tracer 95.

Each tracer comprises a housing 170 having a reciprocable stem 171 urged outwardly of the housing for cooperation with the associated template as by means of a spring 172, and terminates in a bifurcated end portion 173 having a roller 174 engageable with the template. Each tracer also includes a primary winding 176 having opposite ends connected respectively to wires 177 and 178. Wires 177–1 and 178–1 are connected respectively to the terminals 13 and 12 of the excitation panel 99 in order to provide for energization of the primary winding. The wires 177–2 and 178–2 are connected respectively to the terminals 13 and 11 of the excitation panel 99. Each tracer also includes a pair of secondary windings 180 and 181, with adjacent ends of the windings connected to each other and opposite ends connected respectively to wires 182 and 183. The wires 182–1 and 183–1 are connected respectively to the terminals 12 and 16 of the amplifier 93, so that the output from the swarfing tracer is fed to the amplifier. Similarly, the wires 182–2 and 183–2 are connected respectively to the terminals 11 and 16 of the amplifier 93.

A core 185 in each tracer is secured to the stem 171 so that the core is movable with the stem in opposite directions from the neutral center position illustrated in FIG. 3.

In operation, so long as the core 185 is centrally positioned as illustrated, no signal is produced by the tracer. Movement of the core in either direction from the center position produces a signal voltage proportional in amplitude to the amount of displacement from the center position and having a 180° phase shift either side of the center position. It will be understood that as the work supporting table 32 moves longitudinally along the ways 31, the swarfing template 91 moves with the table. As the roller 174–1 of the swarfing tracer engages the template, rises and falls on the pattern edge of the swarfing template cause reciprocation of the tracer stem 171–1. This produces a signal from the swarfing tracer 89 which is proportional in direction and amplitude to the movement of the stem. This voltage signal is transmitted to the amplifier which in turn transmits a signal to the torque motor 87 to effect movement of the motor armature and the valve stem necessary to produce a movement of the milling head 55 as called for by the swarfing template 91. As the milling head moves along the arcuate ways 51 and 52, the feedback tracer 95 is moved also, and the feedback template 97 causes movement of the feedback tracer stem 171–2 to produce a voltage signal equal the signal produced by the swarfing tracer. The feedback signal also is fed to the amplifier which in turn transmits a feedback signal to the torque motor 87. As the feedback signal lags the swarfing signal in time, the feedback signal effects operation of the torque motor to return the motor armature and the valve stem to the central neutral position after completion of the milling head movement dictated by the swarfing template 91. The system is thereby neutralized, holding the milling head in the adjusted position, but receptive to any further changes in the swarfing template 91.

It will be understood that the swarfing template 91 may be replaced at any time by other suitable templates for producing workpieces as desired. On the other hand, the feedback template 97 remains the same at all times and comprises a permanent part of the machine since the feedback signals desired are always the same for a given amount of head movement on the arcuate ways 51 and 52.

The voltage output of the tracers 89 and 95 is linear, that is, the voltage increases as a straight-line function of the amount of core displacement, and since the torque motor produces an output displacement proportional in magnitude and direction to the input differential current, and since the flow through the servo valve is proportional to valve displacement, the ratio of electric tracer stylus deflection to angular movement of the swarfing head is constant. This eliminates the involved mathematics which would otherwise be necessary to produce a template.

As previously noted, the servo valve is a metering valve, that is, the velocity of the swarfing head on the arcuate ways is a function of the rate of flow through the servo valve. Thus, it follows that the rate of positioning of the head is proportional to the degree of change in the template.

Because of the electric feedback tracer utilized, instead of a mechanical feedback, the swarfing template does not require a re-positioning compensation as a result of movement of the swarfing head in any of the three dimensions provided by movement of the table 32, the saddle 43 and the vertical slide 49.

By virtue of the stationary mounting of the swarfing tracer 89, it is possible to utilize very thin substantially planar sheet metal templates with substantially linear edges regardless of the amount of movement of the swarfing head in any of the three directions provided by movement of the table 32, the saddle 43 and the vertical slide 49.

In a typical machine which has been constructed, the table 32 is rated at a movement of 25″ per minute, and the swarfing head is rated at a movement of 20° per minute in either direction from a vertical position. Thus, during 25″ of table travel, the swarfing head may be moved 20° in either direction. In a typical tracer, the stylus is movable .600″ in either direction from the neutral center position. Since .600″ of stylus travel is calculated to produce 20° of head movement, it will be noted that .030″ of stylus movement produces 1° of head movement.

The excitation panel 99 comprises a commercially available unit such as the Minneapolis-Honeywell signal control panel model No. XWJ306A. The detailed internal circuits of the panel have not been described as they are not per se a part of the present invention and are not necessary to an understanding of the invention. Briefly, the panel comprises terminals 1 and 2 which are energized from a standard 110–115 volt A.C. source by means of wires 190 and 191 connected respectively to the terminals 1 and 2 and across the source. The wire 190 preferably connects with a master switch (not shown) in turn connected with the opposite side of the source.

In order to obtain automatic operation of the system as described hereinabove, terminals 3 and 2 of the excitation panel may be connected across the source 190, 191 by means of a manually selectively operable switch 193 having a movable contact 194 which may be positioned to bridge stationary contacts 195, thereby connecting the terminal 3 to the wire 190 through a circuit including a wire 196, a wire 197, and a wire 198.

In order to provide for manual jogging of the swarfing head to position the same in any desired angular position for operation without use of the swarfing tracer 89, the terminals 4 and 2 of the excitation panel 99 may be connected across the source 190, 191 by means including the switch 193 which may be adjusted to position a movable switch contact 200 to bridge stationary switch contacts 201, thereby connecting the terminal 4 to the wire 190 through a circuit including a wire 203 and the wire 198.

The terminals 1 and 2 of the excitation panel 99 provide for energization of a transformer means (not shown) in the excitation panel for providing a 60 cycle A.C. voltage across the terminals 11 and 13, to thereby provide for energization of the primary transformer winding 176–2 in feedback tracer 95. The feedback tracer therefore is energized at all times, as the leads 190 and 191 into the excitation panel are connected across the source at all times.

The terminals 3 and 2 of the excitation panel 99 provide for energization of a transformer means (not shown) providing a 60 cycle A.C. voltage across the terminals 12 and 13 to thereby provide for energization of the swarfing tracer only when the switch contacts 194, 195 are closed as when the switch 193 is manually selectively positioned for automatic operation of the system.

The terminals 4 and 2 of the excitation panel provide for energization of a transformer means (not shown) in the excitation panel providing an A.C. source across the terminals 14, 15 and 16. The terminals 14 and 16 connect to opposite ends of the transformer secondary and the terminal 15 is a center tap to the transformer secondary. The terminals 14 and 16 are also connected respectively by wires 205 and 206 to opposite sides of a potentiometer 207 including a resistance 208 and a movable contact 209. The terminal 15 of the excitation panel is connected by a wire 210 to terminal 16 of the amplifier 93, and the movable contact 209 of the potentiometer is connected by a wire 211 to the terminal 17 of the amplifier 93.

When the manually operable switch 193 is positioned to close the contacts 200, 201, the terminals 14, 15 and 16 of the excitation panel are energized to enable manual positioning of the swarfing head. When the manually positionable contact 209 of the potentiometer is centrally positioned as illustrated in FIG. 3, no signal is produced by the jog control circuit, but the movable contact 209 may be moved in either direction from the neutral central position illustrated in order to manually produce a voltage signal similar to that provided by the swarfing tracer 89 thereby to move the swarfing head in either direction from the vertical position.

It will be understood that when the manual switch 193 is turned to the "Off" position illustrated in FIG. 3 and neither the contacts 194, 195 nor the contacts 200, 201 are closed, no signal is produced by either the swarfing tracer 89 or the jog control potentiometer 207, and in the event the swarfing head is not in a vertical position, the feedback tracer 95 produces a signal which effects automatic return of the head to the vertical position.

The amplifier 93 comprises a commercially available unit such as the Minneapolis-Honeywall amplifier model No. XRJ301B2, which may be energized by connection of its terminals 1 and 2 across the source 190, 191, as by wires 215 and 216. As the details of the amplifier do not per se form a part of the present invention and are not necessary to an understanding of the invention they have been omitted here in order to simplify the disclosure. Briefly, the amplifier provides an A.C. voltage across its terminals 3 and 5 for energizing the primary coil 157 of the differential transformer 98. Signals produced by the transformer secondary 161, 162 are utilized as previously described to provide for accurate positioning of the torque motor armature 142. The amplifier also receives the signals from the swarfing tracer 89, the jog control potentiometer 207 and the feedback tracer 95 to provide a D.C. voltage to the torque motor coils 145 and 146.

We claim:

1. A machine tool, comprising, a reciprocable work support, a tiltable tool head over the work support, a servomotor for tilting the head, and a tracer control for the servomotor including, a control template movable with the work support, a stationary control tracer having a stylus movable in opposite directions from a reference position and engageable with the template to produce control signals dictated by the template, means utilizing the control signals and controlling the servomotor to effect movement of the head in a direction dictated by the template pattern, a feedback template adjacent the head, a feedback tracer on the head having a stylus movable in opposite directions from a reference position and engageable with the feedback template to produce feedback signals equal to the control signals regardless of the direction of head movement and lagging the control signals, and means utilizing the feedback signals and controlling the servomotor to neutralize the latter and thereby stop movement of the head upon completion of the movement dictated by the control template.

2. A milling machine, comprising, a reciprocable work supporting table, a tiltable milling head over the worktable, a fluid servomotor for tilting the head, a servo valve for controlling the servomotor, and a tracer control for the servomotor including, a control template movable with the worktable, a stationary control tracer having a stylus movable in opposite directions from a reference position and engageable with the template to produce control signals dictated by the template, a feedback template adjacent the head, a feedback tracer on the head having a stylus movable in opposite directions from a reference position and engageable with the feedback template to produce feedback signals equal to the control signals on movement of the head in either direction and lagging the control signals, and means utilizing the control signals and controlling the servo valve to effect servomotor operation and movement of the head in accordance with the template pattern, said means utilizing the feedback signals to stop servomotor operation and head movement upon completion of the movement dictated by the control signal.

3. A milling machine, comprising, a reciprocable work supporting table, a tiltable head over the worktable, an electric motor controlling tilting movement of the head, and a tracer control for the motor including, a control template movable with the worktable, an electric control tracer having a movable stylus engageable with the control template to produce an electric control signal, means utilizing the control signal and controlling the motor to effect tilting of the head in accordance with the template pattern, a feedback template adjacent the head, an electric feedback tracer on the head having a movable stylus engageable with the feedback template to produce an electric feedback signal lagging the control signal, and means utilizing the feedback signal and controlling the motor to stop tilting of the head upon completion of the movement dictated by the control template.

4. A swarfing machine, comprising, a machine base, a worktable reciprocable on the base, a tool slide supported on the base for movement over the worktable in two directions normal to each other and both normal to the path of table movement, arcuate guide ways on the tool slide, a swarfing head movable back and forth on the arcuate ways, a fluid motor for reciprocating the head on the ways in opposite directions from a vertical position, a valve controlling the flow of pressure fluid to and from the fluid motor, an electric motor for operating the valve, and a tracer system controlling the electric motor including a swarfing template and a cooperating electric swarfing tracer one mounted stationarily on the machine base and the other mounted on the worktable for movement therewith, said tracer having a movable stylus engageable with the template to produce an electric control signal in accordance with the template pattern, means utilizing the control signal from the swarfing tracer and controlling the electric motor to open the valve as dictated by the swarfing template, a feedback template and a cooperating electric feedback tracer one mounted on the tool slide and the other mounted on the swarfing head for movement therewith, said feedback tracer having a movable stylus engageable with the feedback template to produce a feedback signal proportional to head movement and lagging the control signal, and means utilizing the feedback signal and controlling the electric motor to close the valve as dictated by the feedback template.

5. A swarfing machine, comprising, a reciprocable worktable, arcuate guide ways extending transversely over the table in an upright plane, a swarfing head mounted on the ways for movement in either direction from a vertical position, a servomechanism for moving the head on the ways including a reversible electric torque motor, and a tracer system controlling the torque motor including, a swarfing template movable with the worktable, an electric swarfing tracer stationarily mounted adjacent the path of the template and including a movable stylus engaging the template to produce a control voltage signal proportional in magnitude and direction to the changes in the pattern of the template, a feedback template mounted adjacent the head, an electric feedback tracer on the head including a movable stylus engaging the feedback template to produce a feedback voltage signal proportional in magnitude and direction to head movement, said feedback signal being equal and opposite the control signal and lagging the control signal in time, and means utilizing the control signal and the feedback signal to transmit proportional signals to the torque motor for operating the latter in a direction and in an amount proportional to the direction and magnitude of the difference between the control and feedback signals.

6. A swarfing machine, comprising, a reciprocable worktable, a swarfing head movable in an arcuate path over the table in an upright plane transverse to the table, a piston and cylinder device for moving the head, a valve controlling the flow of fluid to and from the cylinder, and a tracer system controlling the valve including, a swarfing template movable with the table, an electric swarfing tracer having a movable stylus engageable with the template to produce an electric control signal proportional in direction and magnitude to the changes in the template pattern, a feedback template, an electric feedback tracer on the head having a movable stylus engageable with the feedback template to produce an electric feedback signal proportional in direction and magnitude to head movement, said feedback signal being equal and opposite the control signal but lagging the control signal in time, and means for receiving and comparing said signals and operating the valve in a direction and in an amount proportional to the direction and magnitude of the difference in the signals.

7. A swarfing machine as defined in claim 6, wherein said means for receiving and comparing the control and feedback signals comprises an amplifier for receiving the control and feedback signals and transmitting proportional signals, and a torque motor for receiving said proportional signals from the amplifier, comparing the same, and operating the valve in a direction and an amount proportional to the direction and magnitude of the difference in the signals.

8. A swarfing machine as defined in claim 6, wherein the swarfing template is substantially planar and has a substantially linear pattern edge.

9. A swarfing machine, comprising, a reciprocable worktable, a swarfing head movable in an arcuate path over the table, a motor for moving the head, and a tracer system controlling the motor including, a swarfing template movable with the table, an electric swarfing tracer having a movable stylus engageable with the template to produce an electric control signal in accordance with variations in the template pattern, a circuit for energizing the swarfing tracer, a feedback template, an electric feedback tracer on the head having a movable stylus engageable with the feedback template to produce an electric feedback signal in accordance with movement of the head and lagging the control signal, a circuit for energizing the feedback tracer, means for receiving and comparing the control and feedback signals and operating the motor in a direction corresponding to the direction of the difference in the signals, and a manually operable switch in the energizing circuit for the swarfing tracer selectively operable to close the circuit to enable automatic operation of the system or open the circuit to automatically return the swarfing head to a vertical position and enabling manual operation of the system.

10. A swarfing machine as defined in claim 9, including a manually operable electric device for selectively producing a control signal when the swarfing tracer is deenergized thereby to position the head under manual control, an energizing circuit for said electric device, and a manually selectively operable switch in the last recited energizing circuit for selectively energizing or deenergizing said electric device.

11. A swarfing machine as defined in claim 10, wherein said manually operable switches comprise a single double pole double throw switch means, whereby the swarfing tracer and said electric device cannot be energized simultaneously.

12. A machine tool, comprising, in combination, a base, a work table movable on the base, a tool head support on the base, a tool head movable on the support, means for moving the tool head on the support, and a tracer system controlling the moving means including a control template and a cooperating electric control tracer one mounted stationarily on the base and the other on the work table for movement therewith, said tracer having a movable stylus engageable with the template to produce an electric control signal in accordance with the template pattern, means utilizing the control signal and controlling the moving means to effect movement of the tool head as dictated by the control template, a feedback template and a cooperating electric feedback tracer one stationarily mounted on the tool head support and the other on the tool head for movement therewith, said feedback tracer having a movable stylus engageable with the feedback template to produce a feedback signal proportionate to tool head movement and lagging the control signal, and means utilizing the feedback signal and controlling the moving means to neutralize the effect of the control signal and stop the moving means upon completion of the tool head movement dictated by the control template.

13. A machine tool as defined in claim 12, wherein the ratio of movement of the stylus in the control tracer to movement of the tool head is constant throughout the range of movement of the control stylus.

References Cited in the file of this patent

UNITED STATES PATENTS

| | | |
|---|---|---|
| 2,675,743 | Martellotti et al. | Apr. 20, 1954 |
| 2,830,502 | Van de Water | Apr. 15, 1958 |
| 2,870,687 | Roberts et al. | Jan. 27, 1959 |